US010100246B2

(12) United States Patent
Fontenelle et al.

(10) Patent No.: US 10,100,246 B2
(45) Date of Patent: Oct. 16, 2018

(54) POLYSACCHARIDES AND METAL COMPLEXES FOR VISCOSITY (71) Applicant: Halliburton Energy Services, Inc., Houston, TX (US)

(72) Inventors: Lucas Kurtis Fontenelle, Houston, TX (US); Eli Allen Schnoor, Kingwood, TX (US); Aaron Gene Russell, Humble, TX (US); Jeremy Holtsclaw, Kingwood, TX (US); Xiangnan Ye, Cypress, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 15/035,860

(22) PCT Filed: Dec. 11, 2013

(86) PCT No.: PCT/US2013/074346
§ 371 (c)(1),
(2) Date: May 11, 2016

(87) PCT Pub. No.: WO2015/088509
PCT Pub. Date: Jun. 18, 2015

(65) Prior Publication Data
US 2016/0289546 A1 Oct. 6, 2016

(51) Int. Cl.
C09K 8/035 (2006.01)
C09K 8/90 (2006.01)
(Continued)

(52) U.S. Cl.
CPC .............. C09K 8/685 (2013.01); C09K 8/035 (2013.01); C09K 8/887 (2013.01); C09K 8/90 (2013.01);
(Continued)

(58) Field of Classification Search
None
See application file for complete search history.

(56) References Cited

U.S. PATENT DOCUMENTS 5,575,335 A 11/1996 King
6,488,091 B1 12/2002 Weaver et al.
(Continued)

FOREIGN PATENT DOCUMENTS

EP 0282253 B1 6/1994
WO 1988/002392 A2 4/1988
WO 2009/111324 A1 2/2009

OTHER PUBLICATIONS

International Preliminary Report on Patentability issued in related Application No. PCT/US2013/074346, dated Jun. 23, 2016 (8 pages).
(Continued)

Primary Examiner — Angela M DiTrani
Assistant Examiner — Charles R Nold
(74) Attorney, Agent, or Firm — Craig Roddy; Baker Botts L.L.P.

(57) ABSTRACT

A fluid comprising: an aqueous phase; a cellulose derivative dispersed or dissolved in the aqueous phase; a guar derivative dispersed or dissolved in the aqueous phase; a titanium crosslinker dispersed or dissolved in the aqueous phase; and a zirconium crosslinker dispersed or dissolved in the aqueous phase. A method of treating a well or a well system can include: (A) forming a treatment fluid according to the disclosure; and (B) introducing the treatment fluid into a treatment zone of a well.

12 Claims, 5 Drawing Sheets (51) Int. Cl.
*E21B 43/26* (2006.01)
*E21B 43/267* (2006.01)
*C09K 8/68* (2006.01)
*C09K 8/88* (2006.01)

(52) U.S. Cl.
CPC .......... *E21B 43/26* (2013.01); *C09K 2208/28* (2013.01); *E21B 43/267* (2013.01)

(56) References Cited

U.S. PATENT DOCUMENTS

| | | | |
|---|---|---|---|
| 7,785,710 B2 | 8/2010 | Weerawama et al. | |
| 2008/0128129 A1* | 6/2008 | Yeh | E21B 17/02 166/275 |
| 2009/0142165 A1* | 6/2009 | Krause | C23C 14/566 414/217 |
| 2009/0149353 A1* | 6/2009 | Dajani | C09K 8/08 507/216 |
| 2011/0003720 A1 | 1/2011 | Sullivan | |
| 2012/0012316 A1 | 1/2012 | Putzig | |
| 2013/0098618 A1 | 4/2013 | Braganza et al. | |

OTHER PUBLICATIONS

International Search Report and Written Opinion issued in related PCT Application No. PCT/US2013/074346 dated Sep. 9, 2014, 10 pages.

ChemicalBook listing for "Titanium(IV) (Triethanolaminato)Isopropoxide (74665-17-1)" found at http://www.chemicalbook.com/ChemicalProductProperty_EN_CB6361468.htm, published 2017, 2 pages.

ChemicalBook listing for "Titanium bis(triethanolamine)diisopropoxide(36673-16-2)" found at http://www.chemicalbook.com/ChemicalProductProperty_EN_CB5250765.htm, published 2017, 3 pages.

* cited by examiner

*FIG. 5* ically, the disclosure generally relates to compositions and methods for increasing the viscosity of a fluid, which can be used as a treatment fluid in a well.

POLYSACCHARIDES AND METAL COMPLEXES FOR VISCOSITY

CROSS-REFERENCE TO RELATED APPLICATION

The present application is a U.S. National Stage Application of International Application No. PCT/US2013/074346 filed Dec. 11, 2013, which is incorporated herein by reference in its entirety for all purposes.

TECHNICAL FIELD

The disclosure is in the field of producing crude oil or natural gas from subterranean formations. More specifically, the disclosure generally relates to compositions and methods for increasing the viscosity of a fluid, which can be used as a treatment fluid in a well.

BRIEF DESCRIPTION OF THE DRAWING

The accompanying drawing is incorporated into the specification to help illustrate examples according to a presently preferred embodiment of the disclosure. It should be understood that the figures of the drawing are not necessarily to scale.

DETAILED DESCRIPTION OF PRESENTLY PREFERRED EMBODIMENTS AND BEST MODE

Polysaccharides are conventionally used to viscosify water that is used in well treatments to enhance the ability of water to transport solids, reduce fluid loss, and to minimize friction losses. Fluid-loss control and solids transport properties are enhanced by the addition of crosslinkers that tie multiple polymer chains together.

In various embodiments, a fluid is provided, wherein the fluid comprises: an aqueous phase; a cellulose derivative dispersed or dissolved in the aqueous phase; a guar derivative dispersed or dissolved in the aqueous phase; a titanium crosslinker dispersed or dissolved in the aqueous phase; and a zirconium crosslinker dispersed or dissolved in the aqueous phase.

In various embodiments, a method of treating a well is provided, the method comprising the steps of: (A) forming a treatment fluid according to the disclosure; and (B) introducing the treatment fluid into a treatment zone of a well.

In various embodiments, a well system is provided, the well system comprising: a flowpath, the flowpath comprising: a wellhead; and a conduit extending from the wellhead into a wellbore; and a treatment fluid disposed within the flowpath, wherein the treatment fluid comprises: an aqueous phase; a cellulose derivative dispersed or dissolved in the aqueous phase; a guar derivative dispersed or dissolved in the aqueous phase; a titanium crosslinker dispersed or dissolved in the aqueous phase; and a zirconium crosslinker dispersed or dissolved in the aqueous phase.

These and other embodiments of the disclosure will be apparent to one skilled in the art upon reading the following detailed description. While the disclosure is susceptible to various modifications and alternative forms, specific embodiments thereof will be described in detail and shown by way of example. It should be understood, however, that it is not intended to limit the disclosure to the particular forms disclosed.

Definitions and Usages

General Interpretation

The words or terms used herein have their plain, ordinary meaning in the field of this disclosure, except to the extent explicitly and clearly defined in this disclosure or unless the specific context otherwise requires a different meaning.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed. As used herein, the words "consisting essentially of," and all grammatical variations thereof are intended to limit the scope of a claim to the specified materials or steps and those that do not materially affect the basic and novel characteristic(s) of the claimed invention.

The indefinite articles "a" or "an" mean one or more than one of the component, part, or step that the article introduces.

Each numerical value should be read once as modified by the term "about" (unless already expressly so modified), and then read again as not so modified, unless otherwise indicated in context.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Oil and Gas Reservoirs

In the context of production from a well, "oil" and "gas" are understood to refer to crude oil and natural gas, respectively. Oil and gas are naturally occurring hydrocarbons in certain subterranean formations.

A "subterranean formation" is a body of rock that has sufficiently distinctive characteristics and is sufficiently continuous for geologists to describe, map, and name it.

A subterranean formation having a sufficient porosity and permeability to store and transmit fluids is sometimes referred to as a "reservoir."

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

Conventional Reservoirs

Reservoirs can be classified as conventional and unconventional types.

In a conventional reservoir, the hydrocarbons flow to the wellbore in a manner that can be characterized by flow through permeable media, where the permeability may or may not have been altered near the wellbore, or flow through permeable media to a permeable (conductive), bi-wing fracture placed in the formation. A conventional reservoir would typically have a permeability greater than about 1 milliDarcy (equivalent to about 1,000 microDarcy).

A conventional reservoir is usually in a shape that will trap hydrocarbons and that is covered by a relatively impermeable rock, known as cap rock. The cap rock forms a barrier above reservoir rock so that fluids cannot migrate beyond the reservoir. A cap rock capable of being a barrier to fluid migration on a geological time scale has a permeability that is less than about 1 microDarcy. Cap rock is commonly salt, anhydrite, or shale.

In addition, the hydrocarbons located in the reservoir are located vertically based on their density where the movement of one of the reservoir fluid can apply a driving force to another reservoir fluid. Most conventional reservoir rocks are limestone, dolomite, sandstone, or a combination of these.

Unconventional Reservoirs

In a unconventional reservoir, the permeability is less than 1 milliDarcy. Unconventional reservoirs include tight gas and shale.

Tight gas is natural gas that is difficult to access because the permeability is relatively low. Generally, tight gas is in a subterranean formation having a permeability in the range of about 1 milliDarcy (equivalent to about 1,000 microDarcy) down to about 0.01 milliDarcy (equivalent to about 10 microDarcy). Conventionally, to produce tight gas it is necessary to find a "sweet spot" where a large amount of gas is accessible, and sometimes to use various means to create a reduced pressure in the well to help draw the gas out of the formation.

Shale, which is conventionally considered to be a cap rock, can include relatively large amounts of organic material compared with other types of rock. Shale is a sedimentary rock derived from mud. Shale rock is commonly finely laminated (bedded). Particles in shale are commonly clay minerals mixed with tiny grains of quartz eroded from pre-existing rocks. Shale is a type of sedimentary rock that contains clay and minerals such as quartz. Gas is very difficult to produce from shale, however, because the permeability of the shale is often less than about 1 microDarcy. As used herein, an ultra-low permeable formation has a permeability of less than about 1 microDarcy.

Well Servicing and Fluids

To produce oil or gas from a reservoir, a wellbore is drilled into a subterranean formation, which may be the reservoir or adjacent to the reservoir. Typically, a wellbore of a well must be drilled hundreds or thousands of feet into the earth to reach a hydrocarbon-bearing formation.

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a fluid into a well.

Wells

A "well" includes a wellhead and at least one wellbore from the wellhead penetrating the earth. The "wellhead" is the surface termination of a wellbore, which surface may be on land or on a seabed.

A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well or any other tubulars in the well. The "borehole" usually refers to the inside wellbore wall, that is, the rock surface or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

A wellbore can be used as a production or injection wellbore. A production wellbore is used to produce hydrocarbons from the reservoir. An injection wellbore is used to inject a fluid, for example, liquid water or steam, to drive oil or gas to a production wellbore.

Unless otherwise specified, use of the term "wellbore fluid" shall be construed as encompassing all fluids originating from within the wellbore and all fluids introduced or intended to be introduced into the wellbore. Accordingly, the term "wellbore fluid" encompasses, but is not limited to, formation fluids, production fluids, wellbore servicing fluids, the like, and any combinations thereof.

As used herein, introducing "into a well" means introducing at least into and through the wellhead. According to various techniques known in the art, tubulars, equipment, tools, or fluids can be directed from the wellhead into any desired portion of the wellbore.

A conduit can provide a fluid flowpath. For example, a conduit can comprise a string of tubulars or coil tubing. As used herein, the word "tubular" means any kind of structural body in the general form of a tube. Tubulars can be of any suitable body material, but in the oilfield they are most commonly of steel. Examples of tubulars in oil wells include, but are not limited to, a drill pipe, a casing, a tubing string, a liner pipe, and a transportation pipe.

As used herein, the word "treatment" refers to any treatment for changing a condition of a portion of a wellbore or a subterranean formation adjacent a wellbore; however, the word "treatment" does not necessarily imply any particular treatment purpose. A treatment usually involves introducing a fluid for the treatment, in which case it may be referred to as a treatment fluid, into a well. As used herein, a "treatment fluid" is a fluid used in a treatment. The word "treatment" in the term "treatment fluid" does not necessarily imply any particular treatment or action by the fluid.

In the context of a well or wellbore, a "portion" or "interval" refers to any downhole portion or interval along the length of a wellbore.

A "zone" refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." A "treatment zone" refers to a zone into which a fluid is directed to flow from the wellbore. As used herein, "into a treatment zone" means into and through the wellhead and, additionally, through the wellbore and into the treatment zone.

As used herein, a "downhole" fluid (or gel) is an in-situ fluid in a well, which may be the same as a fluid at the time it is introduced, or a fluid mixed with another fluid downhole, or a fluid in which chemical reactions are occurring or have occurred in-situ downhole.

Fluid loss refers to the undesirable leakage of a fluid phase of any type of fluid into the permeable matrix of a zone, which zone may or may not be a treatment zone. Fluid-loss control refers to treatments designed to reduce such undesirable leakage.

Fluid-loss control materials are sometimes used in drilling fluids or in treatment fluids. A fluid-loss control pill is a treatment fluid that is designed or used to provide some degree of fluid-loss control. A fluid-loss control pill is usually used prior to introducing another drilling fluid or treatment fluid into zone.

Generally, the greater the depth of the formation, the higher the static temperature and pressure of the formation. Initially, the static pressure equals the initial pressure in the formation before production.

A "design" refers to the estimate or measure of one or more parameters planned or expected for a particular fluid or stage of a well service or treatment. For example, a fluid can be designed to have components that provide a minimum density or viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment during the time of a treatment. For example, the design temperature for a well treatment takes into account not only the bottom hole static temperature ("BHST"), but also the effect of the temperature of the fluid on the BHST during treatment. The design temperature for a fluid is sometimes referred to as the bottom hole circulation temperature ("BHCT"). Because fluids may be considerably cooler than BHST, the difference between the two temperatures can be quite large. Ultimately, if left undisturbed a subterranean formation will return to the BHST.

Phases, Physical States, and Materials

As used herein, "phase" is used to refer to a substance having a chemical composition and physical state that is distinguishable from an adjacent phase of a substance having a different chemical composition or a different physical state.

The word "material" refers to the substance, constituted of one or more phases, of a physical entity or object. Rock, water, air, metal, cement slurry, sand, and wood are all examples of materials. The word "material" can refer to a single phase of a substance on a bulk scale (larger than a particle) or a bulk scale of a mixture of phases, depending on the context.

As used herein, if not other otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

Dispersions

A dispersion is a system in which particles of a substance of one chemical composition and physical state are dispersed in another substance of a different chemical composition or physical state. In addition, phases can be nested. If a substance has more than one phase, the most external phase is referred to as the continuous phase of the substance as a whole, regardless of the number of different internal phases or nested phases.

A dispersion can be classified in different ways, including, for example, based on the size of the dispersed particles, the uniformity or lack of uniformity of the dispersion, and, if a fluid, by whether or not precipitation occurs.

Hydratability or Solubility

As referred to herein, "hydratable" means capable of being hydrated by contacting the hydratable material with water. Regarding a hydratable material that includes a polymer, this means, among other things, to associate sites on the polymer with water molecules and to unravel and extend the polymer chain in the water.

The term "solution" is intended to include not only true molecular solutions but also dispersions of a polymer wherein the polymer is so highly hydrated as to cause the dispersion to be visually clear and having essentially no particulate matter visible to the unaided eye. The term "soluble" is intended to have a meaning consistent with these meanings of solution.

A substance is considered to be "soluble" in a liquid if at least 10 grams of the substance can be hydrated or dissolved in one liter of the liquid when tested at 77° F. and 1 atmosphere pressure for 2 hours, considered to be "insoluble" if less than 1 gram per liter, and considered to be "sparingly soluble" for intermediate solubility values.

Fluids

A fluid can be a homogeneous or heterogeneous. In general, a fluid is an amorphous substance that is or has a continuous phase of particles that are smaller than about 1 micrometer that tends to flow and to conform to the outline of its container.

Every fluid inherently has at least a continuous phase. A fluid can have more than one phase. For example, a fluid can be in the form of a suspension (larger solid particles dispersed in a liquid phase), a sol (smaller solid particles dispersed in a liquid phase), an emulsion (liquid particles dispersed in another liquid phase), or a foam (a gas phase dispersed in a liquid phase).

The continuous phase of a treatment fluid is a fluid under Standard Laboratory Conditions.

Apparent Viscosity of a Fluid

Viscosity is a measure of the resistance of a fluid to flow. In everyday terms, viscosity is "thickness" or "internal friction." Therefore, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate.

Most fluids are non-Newtonian fluids. Accordingly, the apparent viscosity of a fluid applies only under a particular set of conditions including shear stress versus shear rate, which must be specified or understood from the context. As used herein, a reference to viscosity is actually a reference to an apparent viscosity. Apparent viscosity is commonly expressed in units of mPa·s or centipoise (cP), which are equivalent.

Gels and Deformation

Technically, a "gel" is a semi-solid, jelly-like physical state or phase that can have properties ranging from soft and weak to hard and tough. Shearing stresses below a certain finite value fail to produce permanent deformation. The minimum shear stress that will produce permanent deformation is referred to as the shear strength or gel strength of the gel.

The physical state of a gel is formed by a network of interconnected molecules, such as a crosslinked polymer or a network of micelles in a continuous liquid phase. The network gives a gel phase its structure and an apparent yield point. At the molecular level, a gel is a dispersion in which both the network of molecules is continuous and the liquid is continuous. A gel is sometimes considered as a single phase.

In the oil and gas industry, however, the term "gel" may be used to refer to any fluid having a viscosity-increasing agent, regardless of whether it is a viscous fluid or meets the technical definition for the physical state of a gel. A "base gel" is a term used in the field for a fluid that includes a viscosity-increasing agent, such as guar or other polymer, but that excludes crosslinking agents. Typically, a base gel is mixed with another fluid containing a crosslinker, wherein the mixture is adapted to form a crosslinked gel. Similarly, a "crosslinked gel" may refer to a substance having a viscosity-increasing agent that is crosslinked, regardless of whether it is a viscous fluid or meets the technical definition for the physical state of a gel.

As used herein, a substance referred to as a "gel" is subsumed by the concept of "fluid" if it is a pumpable fluid.

Pumping Time

As used herein, the "pumping time" is the total time required for pumping a treatment fluid into a desired portion or zone of the well plus a safety factor.

General Measurement Terms

Unless otherwise specified or unless the context otherwise clearly requires, any ratio or percentage means by weight.

Unless otherwise specified or unless the context otherwise clearly requires, the phrase "by weight of the water" means the weight of the water of an aqueous phase of the fluid without the weight of any viscosity-increasing agent, dissolved salt, suspended particulate, or other materials or additives that may be present in the water.

If there is any difference between U.S. or Imperial units, U.S. units are intended. For example, "gpt" or "gal/1,000 gal" means U.S. gallons per thousand U.S. gallons and "ppt" means pounds per thousand U.S. gallons.

General Approach

In various embodiments, a fluid is provided, wherein the fluid comprises: an aqueous phase; a cellulose derivative dispersed or dissolved in the aqueous phase; a guar derivative dispersed or dissolved in the aqueous phase; a titanium crosslinker dispersed or dissolved in the aqueous phase; and a zirconium crosslinker dispersed or dissolved in the aqueous phase.

In various embodiments, a method of treating a well is provided, the method comprising the steps of: (A) forming a treatment fluid according to the disclosure; and (B) introducing the treatment fluid into a treatment zone of a well.

Such a crosslinked polysaccharide composition according to the disclosure can be used, for example, in well stimulation operations such as hydraulic fracturing.

According to various embodiments, a treatment fluid is provided that is composed mainly of CMC polymeric material and has better temperature stability than existing CMC-based fluid systems while using 20% less polymer overall. Reduced polymer loading while maintaining temperature stability is a desired property for a treatment fluid. Typically current CMC formulation utilize about 40 lb/1,000 gal of polymer for a stable fracturing fluid with a viscosity in the range of about 1,000 cP to about 1,400 cP measured at 40 l/s. Using the proposed dual polymer and dual crosslinker compositions, we can use about 25 lb/1,000 gal to about 30 lb/1,000 gal for the equivalent viscosity performance In addition, prior treatment fluid have large differences in optimized pH of operation, for example guar with borate crosslinking operates at pH above 9.5, some CMHPG fluids operate at pH about 5, and CMC operates best at pH about 4.5, which optimized pHs are due to the particular crosslinker and mechanism of crosslinking involved in the fluid formulation. Developing multiple polymer crosslinked systems with suitable rheological properties was not known prior to this disclosure.

According to various embodiments of this disclosure, compositions are provided that allow for synergistic mixing of viscosity-increasing agents from different parent polysaccharide sources, while maintaining good viscosity properties for us in various well treatments.

According to various embodiments, the disclosure provides cleaner fracturing fluid for higher temperature applications that reduces the amount of guar, that is, a fracturing fluid that produces lower residue, and would be applicable for temperatures up to about 300° F. (150° C.). For example, prior formulations required about 60 lb/1,000 gal of the CMC polymeric material to provide a viscosity of about 1,000 to about 1,400 cP measured at 40 l/s, but it was only stable for about 30 minutes at 250° F. (121° C.), whereas a dual polymer system according to this disclosure at a total of 40 lb/1,000 gal of the polysaccharide materials provides about 45 to 60 minutes of viscosity stability at 250° F. (121° C.). Accordingly, the present disclosure can provide a fluid having better temperature stability than current CMC based fluids while using 20% less polymer overall.

Aqueous Phase

In various embodiments, the aqueous phase comprises a source of water selected from the group consisting of: freshwater, brackish water, brine, well flow-back water, well produced water, and any combination thereof.

In various embodiments, the aqueous phase comprises an inorganic salt dissolved therein. For example, the aqueous phase can comprise inorganic salt selected from the group consisting of: alkali metal salts; alkaline earth metal salts; ammonium salts, and any combination thereof. In various embodiments, the inorganic salt is selected from the group consisting of halides or formates.

In various embodiments, the aqueous phase has an acidic pH or neutral pH. Preferably, the pH of the continuous aqueous phase of the treatment fluid is in the range of about 4 to about 7.

In certain embodiments, the treatment fluids can include a pH-adjuster. Preferably, the pH adjuster does not have undesirable properties, as discussed above.

The pH-adjuster may be present in the treatment fluids in an amount sufficient to maintain or adjust the pH of the fluid. In some embodiments, the pH-adjuster may be present in an amount sufficient to maintain or adjust the pH of the fluid to a desired pH or range. One of ordinary skill in the art, with the benefit of this disclosure, will recognize the appropriate pH-adjuster and amount thereof to use for a chosen application.

Continuous Phase

In various embodiments, the aqueous phase is a continuous phase of the treatment fluid.

Polysaccharide Derivatives

As used herein, unless the context otherwise requires, a "polymer" or "polymeric material" includes homopolymers, copolymers, terpolymers, etc. In addition, the term "copolymer" as used herein is not limited to the combination of polymers having two monomeric units, but includes any combination of monomeric units, for example, terpolymers, tetrapolymers, etc.

A polymer can be classified as being single chain or multi chain, based on its solution structure in aqueous liquid media. Examples of single-chain polysaccharides that are commonly used in the oilfield industry include guar, guar derivatives, and cellulose derivatives. Examples of multi-chain polysaccharides include xanthan, diutan, and scleroglucan, and derivatives of any of these. Without being limited by any theory, it is currently believed that the multi-chain polysaccharides have a solution structure similar to a helix or are otherwise intertwined.

According to the present disclosure, single-chain polymers are preferred.

As used herein, "modified" or "derivative" means a chemical compound formed by a chemical process from a parent compound, wherein the chemical backbone skeleton of the parent compound is retained in the derivative. The chemical process preferably includes at most a few chemical reaction steps, and more preferably only one or two chemical reaction steps. As used herein, a "chemical reaction step" is a chemical reaction between two chemical reactant species to produce at least one chemically different species from the reactants (regardless of the number of transient chemical species that may be formed during the reaction). An example of a chemical step is a substitution reaction. Substitution on the reactive sites of a polymeric material may be partial or complete.

Guar polymer, which is derived from the beans of a guar plant, is referred to chemically as a galactomannan gum. A guar derivative can be selected from the group consisting of, for example, a carboxyalkyl derivative of guar, a hydroxyalkyl derivative of guar, and any combination thereof. Preferably, the guar derivative is selected from the group consisting of carboxymethylguar, carboxymethylhydroxyethylguar, carboxymethylhydroxypropylguar ("CMHPG"), ethylcarboxymethylguar, hydroxyethylguar, hydroxypropylmethylguar, and hydroxypropylguar ("HPG").

A cellulose derivative can be selected from the group consisting of, for example, a carboxyalkyl derivative of cellulose, a hydroxyalkyl derivative of cellulose, and any combination thereof. Preferably, the cellulose derivative is selected from the group consisting of carboxymethylcellulose ("CMC"), carboxymethylhydroxyethylcellulose, hydroxyethylcellulose, methylcellulose, ethylcellulose, ethylcarboxymethylcellulose, and hydroxypropylmethylcellulose.

Preferably, the polysaccharide or derivative is water-soluble.

In various embodiments, the polysaccharide or derivative can have an average molecular weight in the range of from about 50,000 to 20,000,000, most preferably from about 100,000 to about 4,000,000. For example, guar polymer is believed to have an average molecular weight in the range of about 2 to about 4 million.

Cellulose Derivative to Guar Derivative Ratio

In various embodiments, the concentration of the cellulose derivative is greater than the concentration of the guar derivative. In some embodiments, the ratio of the cellulose derivative to the guar derivative is in a range of about 65:35 to about 75:25.

Crosslinking

Fluid-loss control and solids transport properties are enhanced by the addition of crosslinkers that tie multiple polymer chains together. This results in the formation of gel-like fluids and extreme increase in viscosity. In order to form stable gels, it is necessary that the concentration of the polymer be at or above the $C^*$ (the critical overlap concentration). Crosslinking process, however, reduces the polymer's ability to suppress friction during pumping operations and in fact often results in increased friction. Optimal friction reduction occurs with high molecular weight, linear polymers.

Titanium Crosslinker

In various embodiments, the titanium crosslinker is a titanium complex having one or more kinds of organic ligands. For example, the organic ligands of the titanium complex can be carboxylic acids. In various embodiments, the organic ligands of the titanium complex are carboxylic acids selected from the group consisting of: acetic acid, lactic acid, glycolic acid, benzoic acid, salicylic acid, gluconic acid, butyric acid, propionic acid, and any combination thereof. For example, the titanium crosslinker can be selected from the group consisting of: titanium (triethanolaminato)isopropoxide and titanium diisopropoxide bis (acetylacetonate).

Zirconium Crosslinker

In various embodiments, the zirconium crosslinker is a zirconium complex having one or more kinds of organic ligands. For example, the organic ligands of the zirconium complex can be selected from the group consisting of carboxylic acids and alkanolamines. In various embodiments, the organic ligands of the zirconium complex can be carboxylic acids selected from the group consisting of: acetic acid, lactic acid, glycolic acid, benzoic acid, salicylic acid, gluconic acid, butyric acid, propionic acid, and any combination thereof. For example, the zirconium crosslinker can be selected from the group consisting of: acetic acid, and lactic acid, and any combination thereof. In various embodiments, the organic ligands of the zirconium complex can be alkanolamines selected from the group consisting of: triethanolamine, triisopropyanolamine, diethanolamine, diisopropanolamine, and any combination thereof.

Other Fluid Additives

A treatment fluid can contain additives that are commonly used in oil field applications, as known to those skilled in the art. These include, but are not necessarily limited to, brines, inorganic water-soluble salts, salt substitutes (such as trimethyl or tetramethyl ammonium chloride), pH control additives, surfactants, defoamers, breakers, breaker aids, oxygen scavengers, alcohols, scale inhibitors, corrosion inhibitors, hydrate inhibitors, fluid-loss control additives, proppant, gravel, oxidizers, chelating agents, water-control agents (such as relative permeability modifiers), consolidating agents, proppant flowback control agents, conductivity enhancing agents, clay stabilizers, sulfide scavengers, fibers, nanoparticles, bactericides, and combinations thereof.

Of course, additives should be selected for not interfering with the purpose of the treatment fluid.

Methods of Treating a Well with the Treatment Fluid

According to various embodiments of the disclosure, methods of treating a well are provided, the methods including the steps of: forming a treatment fluid according to the disclosure; and introducing the treatment fluid into the well.

Friction Reducer Applications

In various embodiments, the methods provide a treatment fluid with a friction reducing property.

During the drilling, completion and stimulation of subterranean wells, fluids are often pumped through tubular structures (for example, casing, tubing string, liner pipe, coiled tubing, etc.). A considerable amount of energy may be lost due to turbulence in the treatment fluid. Because of these energy losses, additional horsepower may be necessary to achieve the desired treatment. To reduce these energy losses, certain polymers (referred to herein as "friction-reducing polymers") have been included in these treatment fluids.

Suitable friction reducing polymers should reduce energy losses due to turbulence within the treatment fluid. Those of ordinary skill in the art will appreciate that the friction reducing polymer(s) included in the treatment fluid should have a molecular weight sufficient to provide a desired level of friction reduction. In general, polymers having higher molecular weights may be needed to provide a desirable level of friction reduction. By way of example, the average molecular weight of suitable friction reducing polymers may be at least about 2,500,000, as determined using intrinsic viscosities. In certain embodiments, the average molecular weight of suitable friction reducing polymers may be in the range of from about 7,500,000 to about 20,000,000. Those of ordinary skill in the art will recognize that friction-reducing polymers having molecular weights outside the listed range may still provide some degree of friction reduction. Typically, friction-reducing polymers are linear and flexible, for example, having a persistence length less than 10 nm.

For example, various methods according to this disclosure can provide a "slick water" or "slick brine" consistency to help reduce pumping friction pressures.

Fracturing Treatment Application

In certain embodiments (for example, fracturing operations), the treatment fluid may be introduced into the subterranean formation at or above a pressure sufficient to create or enhance one or more fractures in a portion of the subterranean formation. In an embodiment, the step of introducing comprises introducing under conditions for fracturing a treatment zone. The fluid is introduced into the treatment zone at a rate and pressure that are at least sufficient to fracture the zone.

Designing a fracturing treatment usually includes determining a designed total pumping time for the treatment of the treatment zone or determining a designed total pumping volume of fracturing fluid for the treatment zone. The tail end of a fracturing treatment is the last portion of pumping time into the zone or the last portion of the volume of fracturing fluid pumped into the zone. This is usually about the last minute of total pumping time or about the last wellbore volume of a fracturing fluid to be pumped into the zone. The portion of pumping time or fracturing fluid volume that is pumped before the tail end of a fracturing stage reaches into a far-field region of the zone.

A person of skill in the art is able to plan each fracturing treatment in detail, subject to unexpected or undesired early screenout or other problems that might be encountered in fracturing a well. A person of skill in the art is able to determine the wellbore volume between the wellhead and the zone. In addition, a person of skill in the art is able to determine the time within a few seconds in which a fluid pumped into a well should take to reach a zone.

In addition to being designed in advance, the actual point at which a fracturing fluid is diverted from a zone can be determined by a person of skill in the art, including based on observed changes in well pressures or flow rates.

Fracturing methods can include a step of designing or determining a fracturing treatment for a treatment zone of the subterranean formation prior to performing the fracturing stage. For example, a step of designing can include: (a) determining the design temperature and design pressure; (b) determining the total designed pumping volume of the one or more fracturing fluids to be pumped into the treatment zone at a rate and pressure above the fracture pressure of the treatment zone; (c) designing a fracturing fluid, including its composition and rheological characteristics; (d) designing the pH of the continuous phase of the fracturing fluid, if water-based; (e) determining the size of a proppant of a proppant pack previously formed or to be formed in fractures in the treatment zone; and (f) designing the loading of any proppant in the fracturing fluid.

Forming Treatment Fluid

A fluid can be prepared at the job site, prepared at a plant or facility prior to use, or certain components of the treatment fluid can be pre-mixed prior to use and then transported to the job site. Certain components of the treatment fluid may be provided as a "dry mix" to be combined with treatment fluid or other components prior to or during introducing the treatment fluid into the well.

In various embodiments, the preparation of a treatment fluid can be done at the job site in a method characterized as being performed "on the fly." The term "on the fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

In various embodiments, a step of forming a treatment fluid for use in a well can including the use of mixing equipment, such as commonly found on a well site during a treatment operations, including, for example, a blender or a manifold for mixing two or more component streams form a stream of the treatment fluid.

These various components of a fluid according to the disclosure can be mixed according to various techniques. For example, the cellulose derivative and guar derivative can be dispersed and hydrated in water together or separately and then mixed. The crosslinkers can be added to the mixed polysaccharides according to various techniques. In one technique, separate solutions containing Zr and Ti, respectively, could be added on the fly. In another, the two separate components could be premixed to create one solution for addition for the polymer mixture. A third method is forming a combined solution that contains both Ti and Zr complexes that can be added to the polymer mixture.

Introducing into Well or Zone

Often the step of introducing or delivering a treatment fluid into a well is within a relatively short period after forming the treatment fluid, for example, less within 30 minutes to one hour. More preferably, the step of delivering the fluid is immediately after the step of forming the fluid, which is "on the fly."

It should be understood that the step of introducing or delivering a treatment fluid into a well can advantageously include the use of one or more fluid pumps.

In various embodiments, a design temperature for introducing into the treatment zone is in the range of about 32° F. (0° C.) to about 350° F. (177° C.). In various embodiments, a design temperature for introducing into the treatment zone is in the range of about 32° F. (0° C.) to 300° F. (140° C.).

In various embodiments, the treatment zone includes a portion of a shale formation, tight gas, or other unconventional hydrocarbon bearing formation.

Introducing Below or Above Fracture Pressure

In various embodiments, the step of introducing is at a rate and pressure below the fracture pressure of the treatment zone.

In various embodiments, the step of introducing comprises introducing under conditions for fracturing a treatment zone. The treatment fluid is introduced into the treatment zone at a rate and pressure that are at least sufficient to fracture the zone.

In various embodiments, the step of introducing into the portion of the well is at an estimated shear greater than 200/sec, or greater than 300/sec, or greater than 400/sec, or greater than 500/sec.

Flow Back Conditions

In various embodiments, the step of flowing back is within 5 days of the step of introducing the treatment fluid. In some other various embodiments, the step of flowing back is within 1 day of the step of introducing.

Producing Hydrocarbon from Subterranean Formation

Preferably, after any such use of a treatment fluid according to the disclosure, a step of producing hydrocarbon from the well or a particular zone is the desirable objective.

Examples

To facilitate a better understanding of the present disclosure, the following examples of certain aspects of some embodiments are given. In no way should the following examples be read to limit, or define, the entire scope of the disclosure.

In various embodiments, a fluid according to the disclosure can be formulated as follows. A composition of carboxymethyl cellulose ("CMC") and carboxymethyl hydroxypropyl guar ("CMHPG") at a ratio of 65 to 75 percent of CMC and 25 to 30 percent of CMHPG can be prepared by mixing the dry polymer powders with water at a concentration of 0.25 to 0.6 percent by weight. The water for these tests was municipal water (potable water). The polymer mixture in water is allowed to hydrate under shear, for example, by blending for about 30 minutes. For example, in the laboratory, the polymer mixing in water can be done in a constant-speed blender at a rate in the range can be between about 1,200 rpm and about 3,000 rpm, preferably in the range of about 1,600 rpm to about 2,500 rpm.

Following hydration of the polymer, the pH of the polymer solution in water is controlled in a range between 4.5 and 7.0 using acid, base, or pH buffer such as a carboxylic acid or ammonium acetate. In the examples, the pH was adjusted using acetic acid (20%).

Next, a crosslinker solutions was added to 100 mL of the polymer solution and blended at a shear rate of 1,600 rpm for 30 seconds, or until the polymer appears fully crosslinked. To determine the change in viscosity over time 44 ml of crosslinked fluid is added to the couette of the CHANDLER™ Model 5550 viscometer, and the sample viscosity is monitored. In some of the experiments, the temperature of the fluid was raised from ambient to the target temperature at a heating rate of 10° F. (18° C.) per minute. Where the sample was tested above 200° F. (93° C.) the heating ramp was 7.5° F. (13.5° C.) per minute.

The crosslinker can be a combination of titanium and zirconium crosslinkers. The Ti and Zr crosslinkers can be aqueous solutions of the ions stabilized by ligands such as carboxylic acids (for example, acetic acid, lactic acid, glycolic acid, benzoic acid, salicylic acid, gluconic acid, butyric acid, propionic acid, etc.). The titanium and zirconium ion solution is added to the dilute polysaccharide solution, where upon heating to a temperature greater than 100° F. (38° C.), the apparent viscosity of the solution increases to a value greater than 500 cP when measured at a shear rate of 40 l/s. A dual polymer and dual crosslinking system according to this disclosure is expected to work over a pH range of about 4.5 to about 7.

Figure 1:
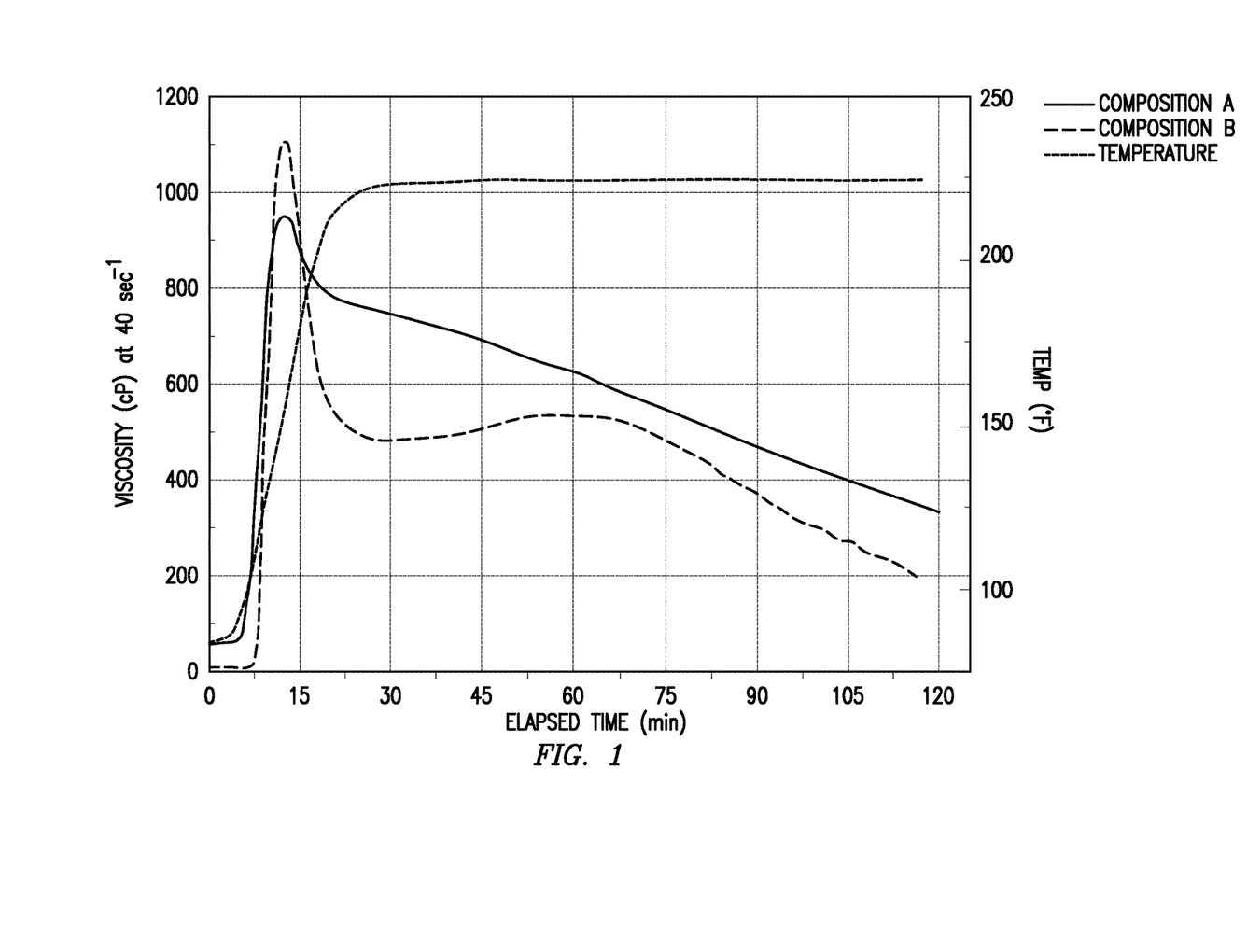
FIG. 1 is a graph of a viscosity profile of a CMC/CMHPG-Ti/Zr composition compared to a CMC-Zr composition at 225° F. (107° C.), showing better viscosity control for the CMC/CMHPG-Ti/Zr composition.

FIG. 1 is a graph of a viscosity profile of a CMC/CMHPG-Ti/Zr composition compared to a CMC-Zr composition at 225° F. (107° C.), showing better viscosity control for the CMC/CMHPG-Ti/Zr composition. More particularly, Composition A in water has CMC at 25 lb/1,000 gal and CMHPG at 15 lb/1,000 gal with 3 gal/1000 gal of a Zr complex (7% Zr by weight) and 0.5 gal/1,000 gal of a titanium complex (5% Ti by weight) added to the solution with vigorous mixing using a blender at about 1600 RPM. Composition B in water has CMC at 40 lb/1,000 gal with 3 gal/1,000 gal (7% Zr by weight) of complexed zirconium at added to the mixture with vigorous mixing at 1600 RPM. The viscosities of the fluids were measured while being heated to 225° F. (107° C.).

Figure 2:
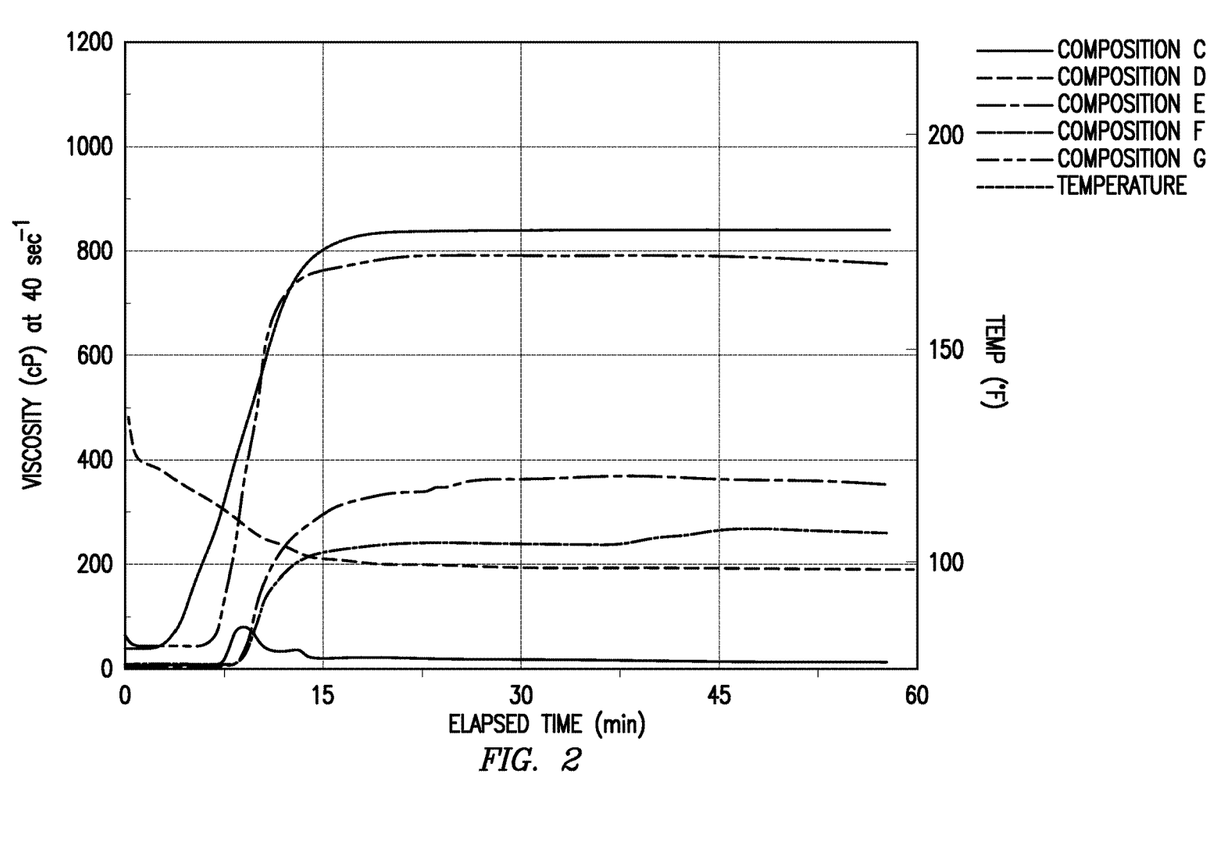
FIG. 2 is a graph of viscosity profiles of various CMC, CMHPG, or mixed polysaccharides with titanium, zirconium, or mixed crosslinkers at pH 6 and 180° F. (82° C.), showing better viscosity control for the fluid with mixed polysaccharides with mixed crosslinkers.

FIG. 2 is a graph of viscosity profiles of various CMC, CMHPG, or mixed polysaccharides with titanium, zirconium, or mixed crosslinkers at pH 6 and 180° F. (82° C.), showing better viscosity control for the fluid with mixed polysaccharides with mixed crosslinkers. More particularly, in FIG. 2, the temperature profiles are for the following compositions shown in Table 1:

TABLE 1

Various CMC, CMHPG, or mixed polysaccharides with various crosslinkers

| Profile | CMC lb/1,000 gal | CMHPG lb/1,000 gal | Zr complex gpt (7% Zr by weight) | Ti complex gpt (_5_% Ti by weight) |
|---|---|---|---|---|
| Composition C | 0 | 10 | 0.3 | 3.0 |
| Composition D | 0 | 10 | 0.3 | 0 |
| Composition E | 30 | 0 | 0 | 3.0 |
| Composition F | 30 | 0 | 0.3 | 3.0 |
| Composition G | 30 | 10 | 0.3 | 3.0 |

FIG. 2 illustrates a synergistic effect of the dual polymer and dual crosslinker compositions on the viscosity profiles of the gels at pH 6 and 180° F. (82° C.).

Figure 3:
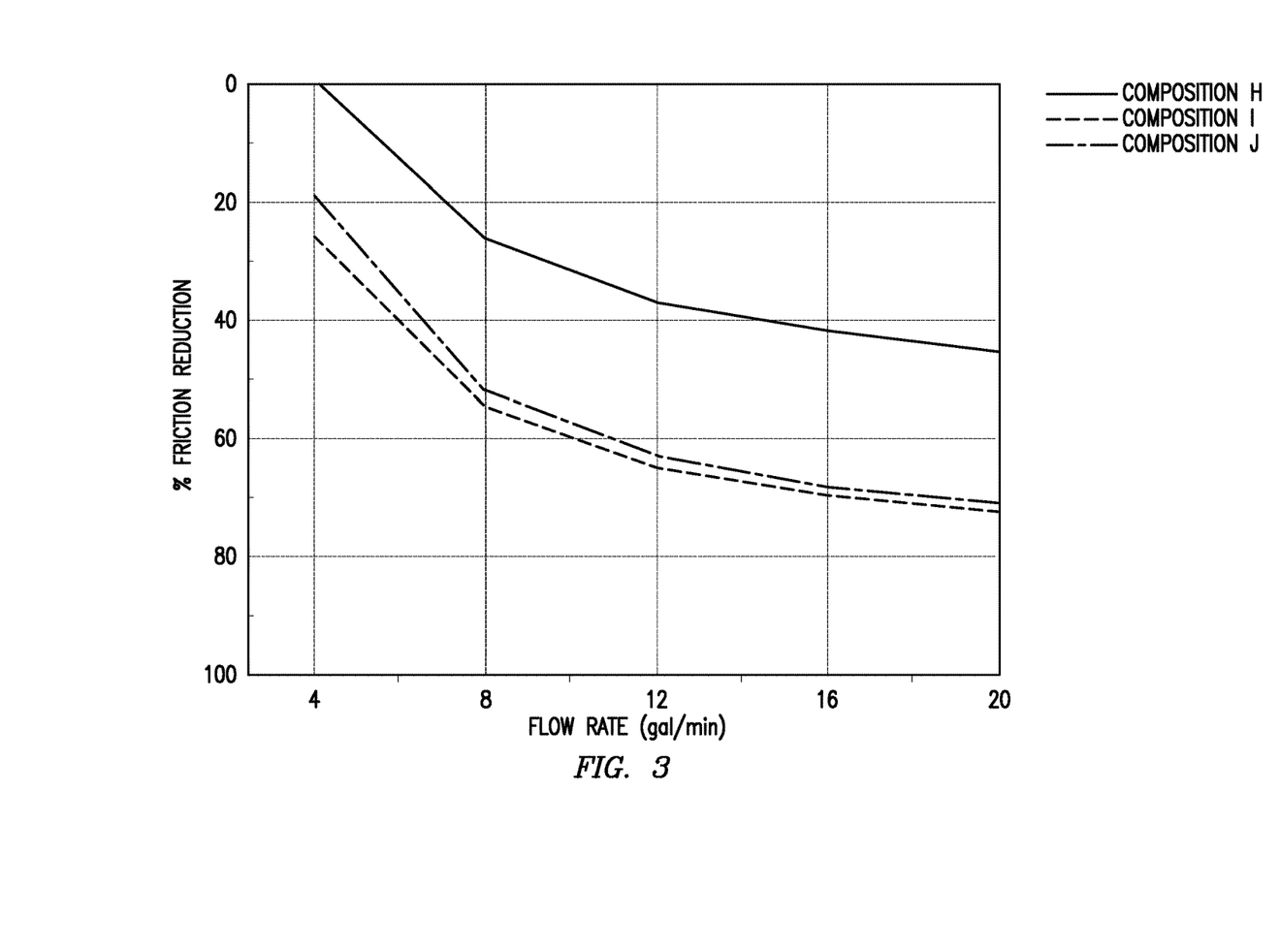
FIG. 3 is a graph of friction reduction profiles for CMC or CMC/CMHPG compositions compared to a guar composition measured at different flow rates, showing that the CMC composition has poor friction reduction, whereas the CMC/CMHPG composition has slightly better friction reduction than guar.

Guar polymer is often used as a benchmark for friction reduction in water. FIG. 3 is a graph of friction reduction profiles for CMC or CMC/CMHPG compositions compared to a guar composition measured at different flow rates and at about Standard Laboratory temperature, showing that the CMC composition has poor friction reduction, whereas the CMC/CMHPG composition has slightly better friction reduction than guar. More particularly, in FIG. 3, Composition H is CMC 10 lb/1,000 gal in water; Composition I is guar 10 lb/1,000 gal in water; and Composition J is CMC 6.25 lb/1,000 gal and CMHPG 3.75 lb/1,000 gal. FIG. 3 illustrates that a polymer composition according to this disclosure has a friction reduction potential close to that of guar at various flow rates.

Figure 4:
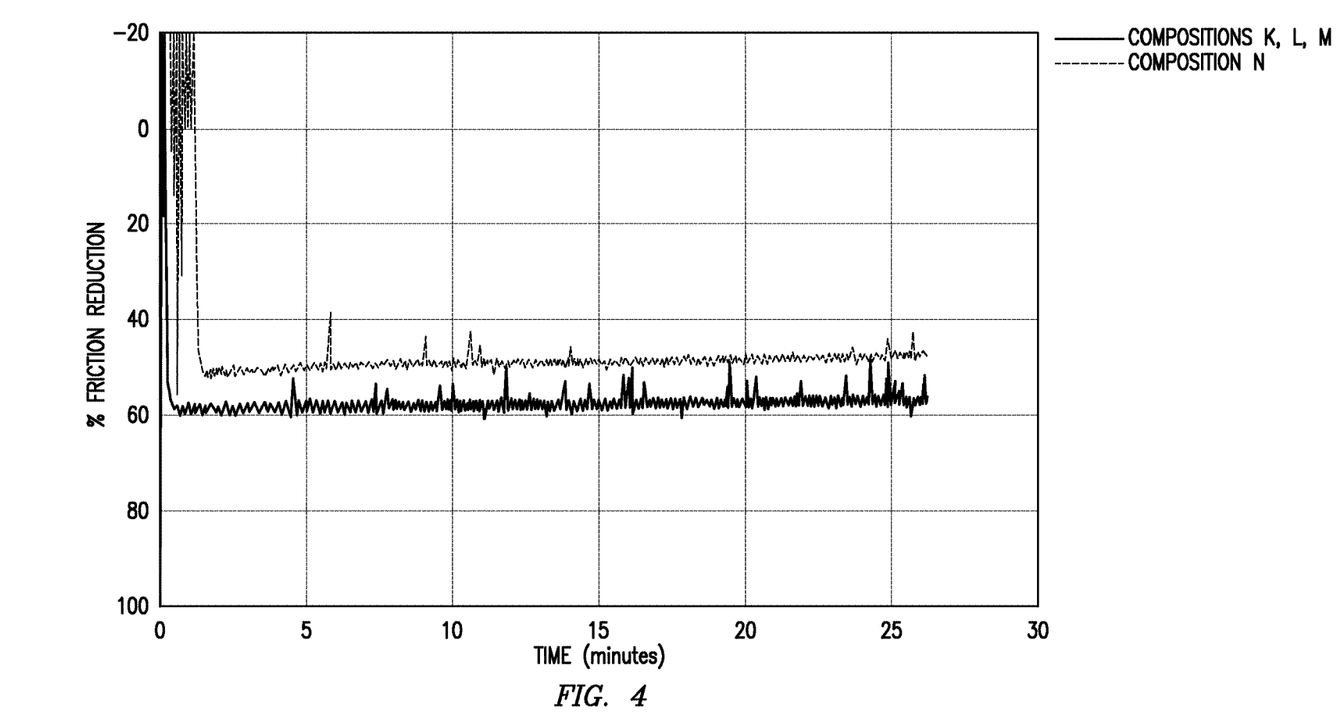
FIG. 4 is a graph of friction reduction profiles of CMC compositions alone or with another measured at 28 gal/min (106 liter/minute), showing that a composition of CMC with guar or with a guar derivative is better than CMC alone.

FIG. 4 is a graph of friction reduction profiles of CMC compositions alone or with guar, HPG, or CMHPG measured at 28 gal/min (106 liter/minute) and at about Standard Laboratory temperature, showing that a composition of CMC with guar or with a guar derivative is better than CMC alone. More particularly, in FIG. 4, Composition K has CMC 45 lb/1,000 gal and guar 5 lb/1,000 gal; Composition L has CMC 45 lb/1,000 gal and HPG 5 lb/1,000 gal in water; Composition N has CMC 45 lb/1,000 gal and CMHPG 5 lb/1,000 gal in water; and Composition N has CMC 45 lb/1,000 gal in water.

Such compositions according to this disclosure can be used to stimulate subterranean formations for oil or gas production. The use of such a formulation as a stimulation fluid depends on the particular composition, a design temperature for use of the formulation, and the suitability of formulation for the treatment. Optimization of the a fluid according to the disclosure for use in a particular treatment can be investigated by studying the viscosity profile of the composition over a certain time under the design temperature.

Figure 5:
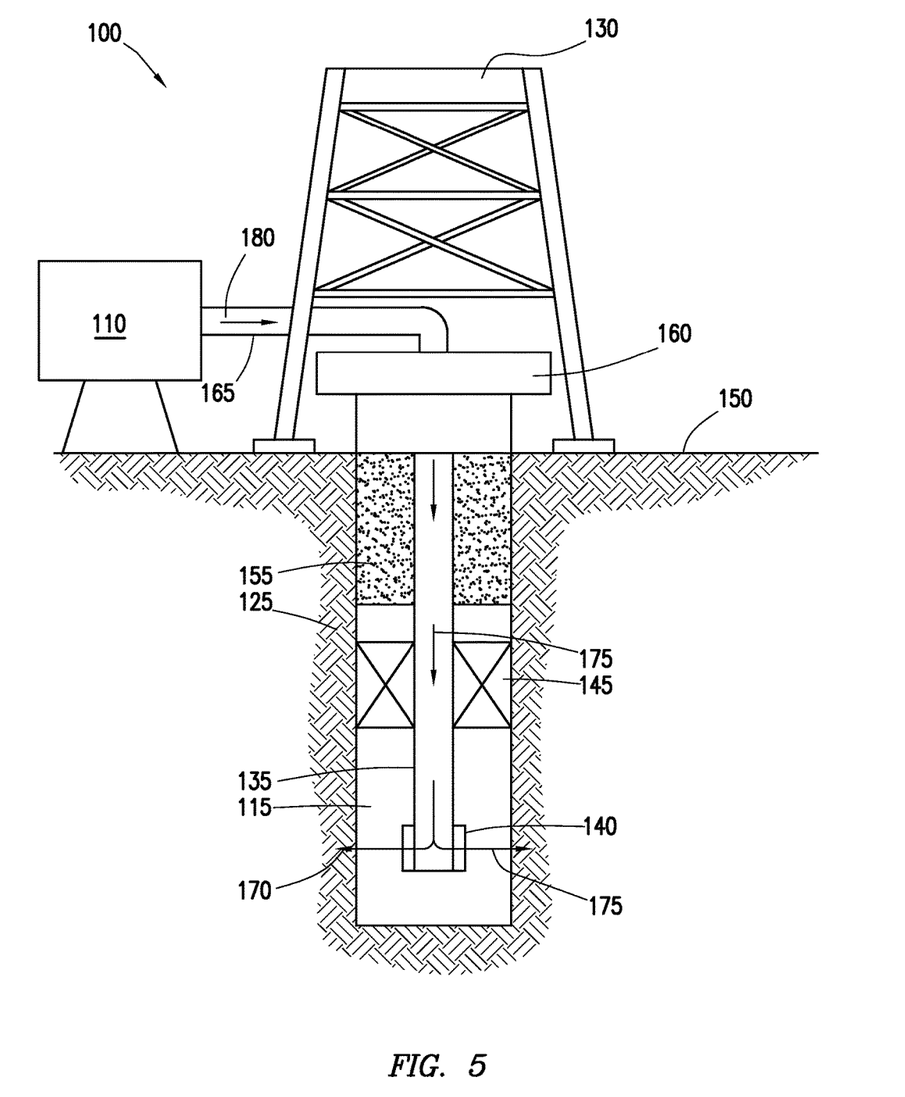
FIG. 5 is a schematic illustration of a well operating environment and system.

FIG. 5 schematically illustrates a well operating environment and system. In the embodiment of FIG. 5, such an operating environment comprises a well site 100 including a wellbore 115 penetrating a subterranean formation 125 for the purpose of recovering hydrocarbons, storing hydrocarbons, disposing of carbon dioxide, injecting wellbore servicing fluids, or the like.

A surface wellbore fluid treatment (SWFT) system 110 for the treatment of a wellbore servicing fluid (WSF) or a component thereof (for example, water) can be deployed at the well site 100 and is fluidly coupled to the wellbore 115 via a wellhead 160.

The wellbore 115 can be drilled into the subterranean formation 125 using any suitable drilling technique. In an embodiment, a drilling or servicing rig 130 can generally comprise a derrick with a rig floor through which a tubular string 135 (e.g., a drill string; a work string, such as a segmented tubing, coiled tubing, jointed pipe, or the like; a casing string; or combinations thereof) may be lowered into the wellbore 115.

A wellbore servicing apparatus 140 configured for one or more wellbore servicing operations (for example, a cementing or completion operation, a clean-out operation, a perforating operation, a fracturing operation, production of hydrocarbons, etc.) can be integrated with or at the end of the tubular string 135 for performing one or more wellbore servicing operations. For example, the wellbore servicing apparatus 140 may be configured to perform one or more servicing operations, for example, fracturing the formation 125, hydrajetting or perforating casing (when present) or the formation 125, expanding or extending a fluid path through or into the subterranean formation 125, producing hydrocarbons from the formation 125, or other servicing operation. In an embodiment, the wellbore servicing apparatus 140 may comprise one or more ports, apertures, nozzles, jets, windows, or combinations thereof suitable for the communication of fluid from a flowpath of the tubular string 135 or a flowpath of the wellbore servicing apparatus 140 to the subterranean formation 125. In an embodiment, the wellbore servicing apparatus 140 is actuatable (for example, openable or closable), for example, comprising a housing comprising a plurality of housing ports and a sleeve being movable with respect to the housing, the plurality of housing ports being selectively obstructed or unobstructed by the sliding sleeve so as to provide a fluid flowpath to or from the wellbore servicing apparatus 140 into the wellbore 115, the subterranean formation 125, or combinations thereof. In an embodiment, the wellbore servicing apparatus 140 may be configurable for the performance of multiple wellbore servicing operations.

Additional downhole tools can be included with or integrated within the wellbore servicing apparatus 140 or the tubular string 135, for example, one or more isolation devices 145 (for example, a packer, such as a swellable or mechanical packer) may be positioned within the wellbore 115 for the purpose of isolating a portion of the wellbore 115.

The drilling or servicing rig 130 can be conventional and can comprise a motor-driven winch and other associated equipment for lowering the tubular string 135 or wellbore servicing apparatus 140 into the wellbore 115. Alternatively, a mobile workover rig, a wellbore servicing unit (e.g., coiled tubing units), or the like may be used to lower the tubular string 135 or wellbore servicing apparatus 140 into the wellbore 115 for performing a wellbore servicing operation.

The wellbore 115 may extend substantially vertically away from the earth's surface 150 over a vertical wellbore portion, or may deviate at any angle from the earth's surface 150 over a deviated or horizontal wellbore portion. Alternatively, portions or substantially all of the wellbore 115 may be vertical, deviated, horizontal, or curved.

In various embodiments, the tubular string 135 may comprise a casing string, a liner, a production tubing, coiled tubing, a drilling string, the like, or combinations thereof. The tubular string 135 may extend from the earth's surface 150 downward within the wellbore 115 to a predetermined or desirable depth, for example, such that the wellbore servicing apparatus 140 is positioned substantially proximate to a portion of the subterranean formation 125 to be serviced (for example, into which a fracture 170 is to be introduced).

In some instances, a portion of the tubular string 135 can be secured into position within the wellbore 115 in a conventional manner using cement 155; alternatively, the tubular string 135 may be partially cemented in wellbore 115; alternatively, the tubular string 135 may be uncemented in the wellbore 115.

In an embodiment, the tubular string 135 can comprise two or more concentrically positioned strings of pipe (for example, a first pipe string such as jointed pipe or coiled tubing may be positioned within a second pipe string such as casing cemented within the wellbore).

In an embodiment, the SWFT system 110 can be coupled to the wellhead 160 via a conduit 165, and the wellhead 160 may be connected (for example, fluidly) to the tubular string 135. Flow arrows 180 and 175 indicate a route of fluid communication from the SWFT system 110 to the wellhead 160 via conduit 165, from the wellhead 160 to the wellbore servicing apparatus 140 via tubular string 135, and from the wellbore servicing apparatus 140 into the wellbore 115 or into the subterranean formation 125 (for example, into fractures 170).

It should be understood, of course, that during production of fluid from the subterranean formation, the fluid flows in the reverse direction from the subterranean formation 125, through a wellbore servicing apparatus 140, through tubular string 135, to the wellhead 160, and out via a conduit, such as conduit 165, and beyond.

Although one or more of the figures may exemplify a given operating environment, the principles of the devices, systems, and methods disclosed can be similarly applicable in other operational environments, such as offshore or subsea wellbore applications.

CONCLUSION

Therefore, the present disclosure is well adapted to attain the ends and advantages mentioned as well as those that are inherent therein.

The exemplary fluids disclosed herein may directly or indirectly affect one or more components or pieces of equipment associated with the preparation, delivery, recapture, recycling, reuse, or disposal of the disclosed fluids. For example, the disclosed fluids may directly or indirectly affect one or more mixers, related mixing equipment, mud pits, storage facilities or units, fluid separators, heat exchangers, sensors, gauges, pumps, compressors, and the like used generate, store, monitor, regulate, or recondition the exemplary fluids. The disclosed fluids may also directly or indirectly affect any transport or delivery equipment used to convey the fluids to a well site or downhole such as, for example, any transport vessels, conduits, pipelines, trucks, tubulars, or pipes used to fluidically move the fluids from one location to another, any pumps, compressors, or motors (for example, topside or downhole) used to drive the fluids into motion, any valves or related joints used to regulate the pressure or flow rate of the fluids, and any sensors (i.e., pressure and temperature), gauges, or combinations thereof, and the like. The disclosed fluids may also directly or indirectly affect the various downhole equipment and tools that may come into contact with the chemicals/fluids such as, but not limited to, drill string, coiled tubing, drill pipe, drill collars, mud motors, downhole motors or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The particular embodiments disclosed above are illustrative only, as the present disclosure may be modified and practiced in different but equivalent manners apparent to those skilled in the art having the benefit of the teachings herein. It is, therefore, evident that the particular illustrative embodiments disclosed above may be altered or modified and all such variations are considered within the scope of the present disclosure.

The various elements or steps according to the disclosed elements or steps can be combined advantageously or practiced together in various combinations or sub-combinations of elements or sequences of steps to increase the efficiency and benefits that can be obtained from the disclosure.

It will be appreciated that one or more of the above embodiments may be combined with one or more of the other embodiments, unless explicitly stated otherwise.

The illustrative disclosure can be practiced in the absence of any element or step that is not specifically disclosed or claimed.

Furthermore, no limitations are intended to the details of construction, composition, design, or steps herein shown, other than as described in the claims.

What is claimed is:

1. A method of treating a well, the method comprising:
   (A) forming a treatment fluid comprising:
      an aqueous phase having a pH in the range of about 4 to about 7;
      a cellulose derivative dispersed or dissolved in the aqueous phase, wherein the cellulose derivative is selected from the group consisting of: a carboxyalkyl derivative of cellulose, a hydroxyalkyl derivative of cellulose, and any combination thereof;
      a guar derivative dispersed or dissolved in the aqueous phase;
      a titanium crosslinker dispersed or dissolved in the aqueous phase, wherein the titanium crosslinker is a titanium complex comprising one or more organic ligand selected from the group consisting of: glycolic acid, benzoic acid, salicylic acid, gluconic acid, butyric acid, propionic acid, and any combination thereof; and
      a zirconium crosslinker dispersed or dissolved in the aqueous phase, wherein the zirconium crosslinker is a zirconium complex comprising one or more organic ligand selected from the group consisting of: glycolic acid, benzoic acid, salicylic acid, gluconic acid, butyric acid, propionic acid, triisopropanolamine, diethanolamine, diisopropanolamine, and any combination thereof,
         wherein the ratio of the concentration of the cellulose derivative to the concentration of the guar derivative in the treatment fluid is in a range of about 65:35 to about 75:25 by weight; and
   (B) introducing the treatment fluid into a treatment zone of a well.

2. The method according to claim 1, wherein introducing the treatment fluid is at a rate and pressure at least sufficient to fracture the treatment zone.

3. The method according to claim 2, wherein the treatment zone includes a portion of a shale formation, tight gas, or other unconventional hydrocarbon bearing formation.

4. The method according to claim 1, wherein forming the treatment fluid comprises mixing at least a portion treatment fluid in mixing equipment.

5. The method according to claim 1, wherein introducing the treatment fluid comprises pumping the treatment fluid using one or more fluid pumps.

6. The method according to claim 1, wherein introducing the treatment fluid comprises introducing the treatment fluid through a tubular in a wellbore of the well.

7. A well system comprising:
   a flowpath, the flowpath comprising:
      a wellhead; and
      a conduit extending from the wellhead into a wellbore; and
   a treatment fluid disposed within the flowpath, wherein the treatment fluid comprises:
      an aqueous phase having a pH in the range of about 4 to about 7;
      a cellulose derivative dispersed or dissolved in the aqueous phase, wherein the cellulose derivative is selected from the group consisting of: a carboxyalkyl derivative of cellulose, a hydroxyalkyl derivative of cellulose, and any combination thereof;
      a guar derivative dispersed or dissolved in the aqueous phase;
      a titanium crosslinker dispersed or dissolved in the aqueous phase, wherein the titanium crosslinker is a titanium complex comprising one or more organic ligand selected from the group consisting of: glycolic acid, benzoic acid, salicylic acid, gluconic acid, butyric acid, propionic acid, and any combination thereof; and
      a zirconium crosslinker dispersed or dissolved in the aqueous phase, wherein the zirconium crosslinker is a zirconium complex comprising one or more organic ligand selected from the group consisting of: glycolic acid, benzoic acid, salicylic acid, gluconic acid, butyric acid, propionic acid, triisopropanolamine, diethanolamine, diisopropanolamine, and any combination thereof, wherein the ratio of the concentration of the cellulose derivative to the concentration of the guar derivative in the treatment fluid is in a range of about 65:35 to about 75:25 by weight.

8. The well system of claim 7 further comprising one or more fluid pumps in fluid communications with the flowpath.

9. A method comprising introducing a treatment fluid into a wellbore penetrating at least a portion of a subterranean formation, wherein the treatment fluid comprises:

an aqueous phase having a pH in the range of about 4 to about 7;

a cellulose derivative dispersed or dissolved in the aqueous phase, wherein the cellulose derivative is selected from the group consisting of: a carboxyalkyl derivative of cellulose, a hydroxyalkyl derivative of cellulose, and any combination thereof;

a guar derivative dispersed or dissolved in the aqueous phase;

a titanium crosslinker dispersed or dissolved in the aqueous phase, wherein the titanium crosslinker is titanium (triethanolaminato)isopropoxide or titanium diisopropoxide bis(acetylacetonate); and a zirconium crosslinker dispersed or dissolved in the aqueous phase, wherein the zirconium crosslinker is a zirconium complex comprising one or more organic ligand selected from the group consisting of: glycolic acid, benzoic acid, salicylic acid, gluconic acid, butyric acid, propionic acid, triisopropanolamine, diethanolamine, diisopropanolamine, and any combination thereof, wherein the ratio of the concentration of the cellulose derivative to the concentration of the guar derivative in the treatment fluid is in a range of about 65:35 to about 75:25 by weight.

10. The method of claim 9, wherein the treatment fluid is introduced into the wellbore at a rate and pressure sufficient to fracture a treatment zone within the subterranean formation.

11. The method of claim 9, wherein the cellulose derivative is water-soluble.

12. The method of claim 9, wherein the guar derivative is selected from the group consisting of: a carboxyalkyl derivative of guar, a hydroxyalkyl derivative of guar, and any combination thereof.

* * * * *